United States Patent
Bird et al.

(10) Patent No.: US 9,828,759 B2
(45) Date of Patent: Nov. 28, 2017

(54) INLET BAFFLE ASSEMBLY FOR AN IN-LINE INTERCEPTOR

(71) Applicant: CANPLAS INDUSTRIES LTD., Barrie (CA)

(72) Inventors: Andrew Bird, Shanty Bay (CA); Timothy James Hendrie Poupore, Toronto (CA); Steve Armstrong, Toronto (CA); Michael F. Wilson, Toronto (CA)

(73) Assignee: Canplas Industries Ltd., Barrie, Ontario (CA)

( * ) Notice: Subject to any disclaimer, the term of this patent is extended or adjusted under 35 U.S.C. 154(b) by 653 days.

(21) Appl. No.: 14/325,718

(22) Filed: Jul. 8, 2014

(65) Prior Publication Data

US 2015/0152629 A1    Jun. 4, 2015

(30) Foreign Application Priority Data

Nov. 29, 2013 (CA) ..................... 2835578

(51) Int. Cl.
| | |
|---|---|
| *E02F 5/16* | (2006.01) |
| *C02F 1/40* | (2006.01) |
| *E03F 5/16* | (2006.01) |
| *B01D 17/02* | (2006.01) |

(52) U.S. Cl.
CPC ............ *E03F 5/16* (2013.01); *B01D 17/0211* (2013.01); *C02F 1/40* (2013.01); *C02F 2307/08* (2013.01)

(58) Field of Classification Search
CPC .......... E03F 5/14; E03F 5/16; B01D 17/0208; B01D 17/0211; C02F 1/40; C02F 2307/08

USPC ........ 210/170.03, 519, 532.1, 538, 540, 801
See application file for complete search history.

(56) References Cited

U.S. PATENT DOCUMENTS

| | | | |
|---|---|---|---|
| 2,003,140 A | 5/1935 | Dehn | |
| 2,285,893 A * | 6/1942 | Boosey | ............. B01D 17/0208 210/519 |
| 2,414,949 A | 1/1947 | Hirshstein | |
| 5,030,357 A * | 7/1991 | Lowe | ....................... E03F 5/16 210/804 |
| 5,271,853 A | 12/1993 | Batten | |

(Continued)

FOREIGN PATENT DOCUMENTS

| | | |
|---|---|---|
| CA | 2299134 C | 9/2009 |
| CA | 2672865 C | 7/2012 |
| CA | 2769800 A1 | 8/2013 |

*Primary Examiner* — Christopher Upton
(74) *Attorney, Agent, or Firm* — Hoffmann & Baron, LLP

(57) ABSTRACT

There is an inlet baffle assembly for use in an in-line interceptor for separating FOG from wastewater and a method of cleaning the inlet baffle assembly without the need for removal from the interceptor. The inlet baffle assembly has an inlet baffle for the grease collecting chamber of an in-line interceptor which defines a flow channel through which influent enters the collecting chambers and has a moveable section moveable between open and closed positions. The inlet baffle assembly also has a flow control element to control the rate of flow of influent entering the flow channel when the moveable section is in the closed position. The flow control element is accessible for cleaning when the moveable section is in the open position. After cleaning, the moveable section is moved into the closed position to facilitate fluid flowing through the inlet baffle assembly into the grease collecting chamber.

34 Claims, 16 Drawing Sheets

(56) References Cited

U.S. PATENT DOCUMENTS

| | | | |
|---|---|---|---|
| 5,505,860 A | 4/1996 | Sager | |
| 5,714,069 A | 2/1998 | Sager | |
| 6,951,615 B2 | 10/2005 | Tripodi et al. | |
| 7,296,694 B2 | 11/2007 | Weymouth | |
| 7,300,588 B2 | 11/2007 | Broeders et al. | |
| 7,427,356 B2 | 9/2008 | Chapin | |
| 7,452,472 B2 | 11/2008 | Hodgekins et al. | |
| 7,481,321 B2 | 1/2009 | Ismert | |
| 7,686,961 B1 * | 3/2010 | Glynne | E03F 5/14 210/170.03 |
| 8,017,004 B2 * | 9/2011 | Crumpler | E03F 1/00 210/170.03 |
| 2011/0315617 A1 * | 12/2011 | Duran | E03F 5/16 210/170.03 |

* cited by examiner

INLET BAFFLE ASSEMBLY FOR AN IN-LINE INTERCEPTOR

FIELD OF THE INVENTION

This invention relates generally to the field of wastewater management and in particular to grease interceptors of the type which are used on wastewater outflows from, for example, commercial food establishments. Grease interceptors are typically used to prevent fats, oils and grease ("FOG") from entering the sanitary sewage system. In particular, this invention relates to an inlet baffle assembly for use in such a grease interceptor.

BACKGROUND OF THE INVENTION

In many food preparation facilities, such as commercial kitchens and restaurants, the sink is a major source of various types of food waste. In the course of normal operation, liquid food wastes containing FOG are inadvertently or intentionally introduced to the drainage system and, in other cases, a mechanical chopper such as a garborator is used to shred the food waste as it leaves the sink and enters the wastewater system. Many food preparation establishments, such as commercial restaurants and the like, have multiple sinks for such food waste disposal.

In the majority of jurisdictions, the disposal from commercial kitchens of FOG and FOG laden debris into the sanitary sewage system is prohibited. There are a number of reasons why this is so, including the ability of those types of materials to clog or plug sanitary sewage systems and the difficulty of adequately treating such materials in a sewage treatment facility. Therefore, many jurisdictions require that these materials be removed from the wastewater stream before permitting the wastewater stream to be added to the sanitary sewer system.

As a result, devices known as grease interceptors have been developed. These grease interceptors are connected to the wastewater effluent stream from the food preparation kitchen or other facility and are integrated with the building drain before entering the municipal system. The interceptor may commonly be located internally within the kitchen or externally adjacent to the building. The grease interceptors may take a number of forms, but typically consist of an in-line container which is mounted on, at or below grade within the wastewater discharge system downstream of all of the discharging appliances and the like. The container includes features that are configured to allow fats, oils and grease to float to the surface of the container where they can be physically or mechanically removed for controlled disposal. In this way these wastes are removed from the wastewater before the wastewater enters the sanitary sewer system.

Some examples of grease interceptors include the following:

U.S. Pat. No. 2,003,140 issued May 28, 1935;
U.S. Pat. No. 2,414,949 issued Jan. 28, 1947;
U.S. Pat. No. 5,271,853 issued Dec. 21, 1993;
U.S. Pat. No. 5,505,860 issued Apr. 9, 1996;
U.S. Pat. No. 5,714,069 issued Feb. 3, 1998;
U.S. Pat. No. 6,951,615 issued Oct. 4, 2005;
U.S. Pat. No. 7,296,694 issued Nov. 20, 2007;
U.S. Pat. No. 7,300,588 issued Nov. 27, 2007;
U.S. Pat. No. 7,427,356 issued Sep. 23, 2008;
U.S. Pat. No. 7,452,472 issued Nov. 18, 2008;
U.S. Pat. No. 7,481,321 issued Jan. 27, 2009;
Canadian Patent No. 2,299,134 issued Sep. 1, 2009;
Canadian Patent No. 2,672,865 issued Jul. 31, 2012; and
Canadian Patent Application No. 2,769,800, published Aug. 28, 2013.

While these different inventions all have various features and benefits, consistent challenges facing these interceptors, particularly for larger interceptors, include: efficiently separating FOG from wastewater, controlling the rate of flow into the tank and clearing blockages within the system. Some more developed solutions employ flow control devices to manage the flow rate of fluid entering the interceptors, but those devices are often at risk of being blocked by foreign object debris. Removable baffles have been used to attempt to allow cleaning within an interceptor, but these prior art removable baffles often do not provide access to fluid channels within inlet assemblies which may contain blockages. In addition, these prior art removable baffles are not always accessible or are obstructed by external objects or elements within the operational environment. What is desired is a way to control the flow rate and type of flow of fluid through a grease interceptor to effectively separate FOG from wastewater without excessively turbulent flow. What is also desired is a way to provide for the separation of FOG using a grease interceptor within which key functional elements can be cleaned, accessed and unblocked more easily.

SUMMARY OF THE INVENTION

The present invention is directed to an inlet baffle assembly for an inline interceptor. In particular, the inlet baffle assembly may be placed in a grease collecting chamber of an in-line wastewater grease interceptor. The inlet baffle assembly should preferably allow for the efficient separation of FOG from wastewater. The inlet baffle assembly according to the present invention may also preferably control the rate of flow into the grease collecting chamber to try to achieve desirable flow rates which permit efficient FOG separation. The inlet baffle assembly may also preferably provide a mechanism for clearing blockages within the upstream system without the need for any independent means of access in the unit or the associated drainage system. The inlet baffle assembly may also preferably accommodate the provision of alternate orifice plates so as to manage a range of flow rates as determined by the manufacturer.

In one preferred embodiment of the present invention there may be provided an inlet baffle assembly for use in an in-line interceptor used to separate fats, oil and grease from wastewater. The interceptor may have a wastewater inlet opening through which influent will pass, an outflow opening and a grease collecting chamber hydraulically located between said inflow opening and said outflow opening. The inlet baffle assembly may also have an inlet baffle sized and shaped to fit into the grease collecting chamber. The inlet baffle defines a flow channel connected to the inflow opening through which influent enters the grease collecting chamber. The inlet baffle may have a moveable section being moveable between an open position and a closed position. The inlet baffle assembly may also have a flow control orifice associated with said inlet baffle to control the rate of influent flow entering the flow channel when the moveable section is in the closed position. The flow control element may be positioned so as to be accessible for cleaning and inspection when the moveable section is in the open position. The flow control element may be used to limit the flow rate into the chamber to a flow rate that encourages good FOG separation, for example, by avoiding turbulent flow through the chamber.

In another embodiment of the present invention there is a method of cleaning an inlet baffle assembly in an in-line interceptor. The interceptor may be an inflow opening through which influent will pass, an outflow opening and a grease collecting chamber hydraulically located between said inflow opening and said outflow opening. The method includes the step of providing an inlet baffle assembly within the in-line interceptor, where the inlet baffle assembly may include: (a) an inlet baffle defining a flow channel connected to the inflow opening through which influent flows into the grease collecting chamber, the inlet baffle having a moveable section being moveable between an open position and a closed position and (b) a flow control orifice associated with said inlet baffle to limit the rate of flow of wastewater through the flow channel when the moveable section is in the closed position. The method may also include moving the moveable section into the open position, cleaning the inlet baffle assembly while the moveable section is in the open position and moving the moveable section into the closed position in order to facilitate fluid flowing through the inlet baffle assembly into the grease collecting chamber.

BRIEF DESCRIPTION OF THE DRAWINGS

Reference will now be made, by way of example only, to preferred embodiments of the inventions and in which.

DETAILED DESCRIPTION OF THE PREFERRED EMBODIMENTS

Figure 17:
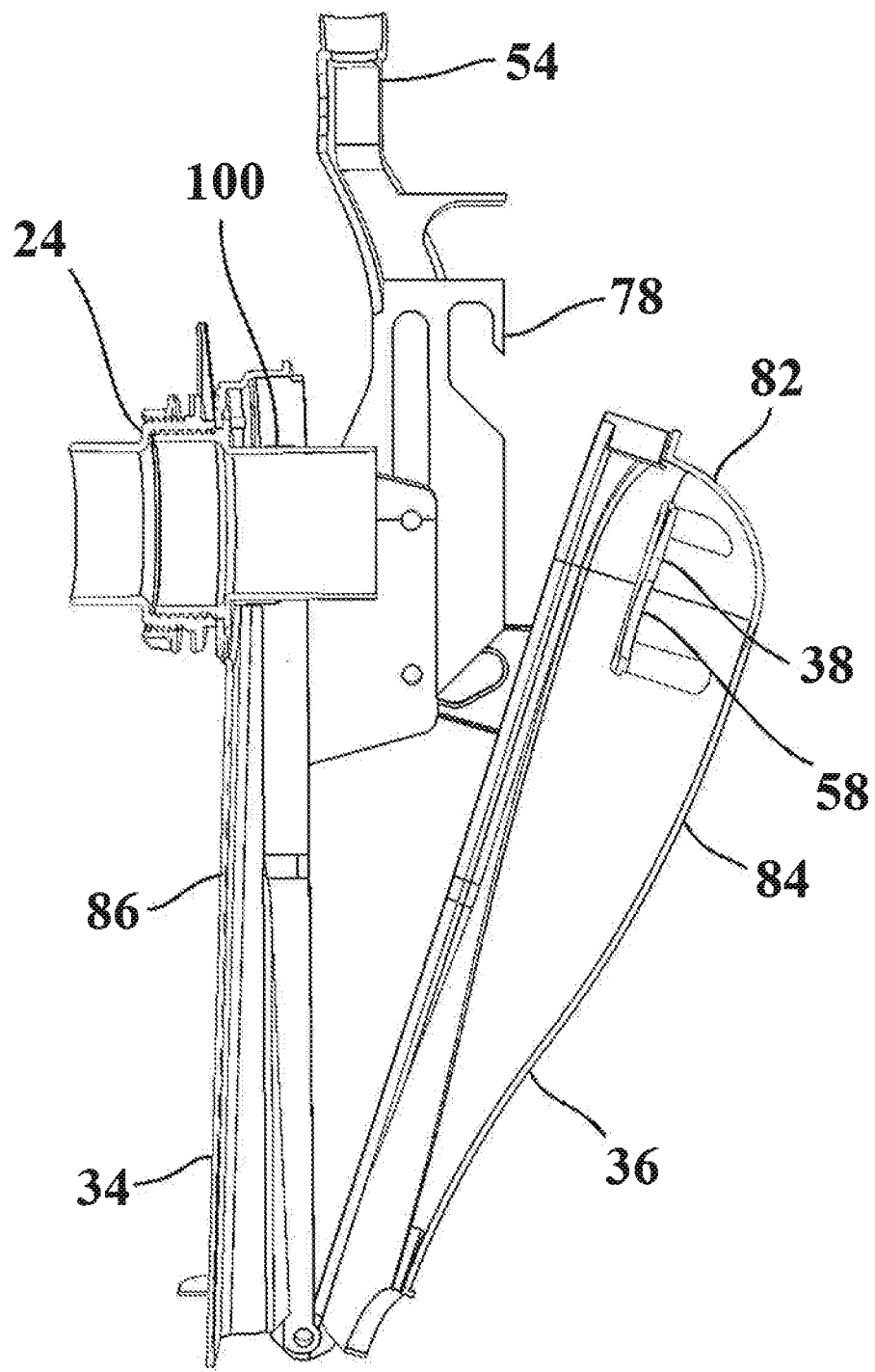
FIG. 17 is a cross-sectional side perspective view of an embodiment of the inlet baffle assembly in an open position.
Figure 18:
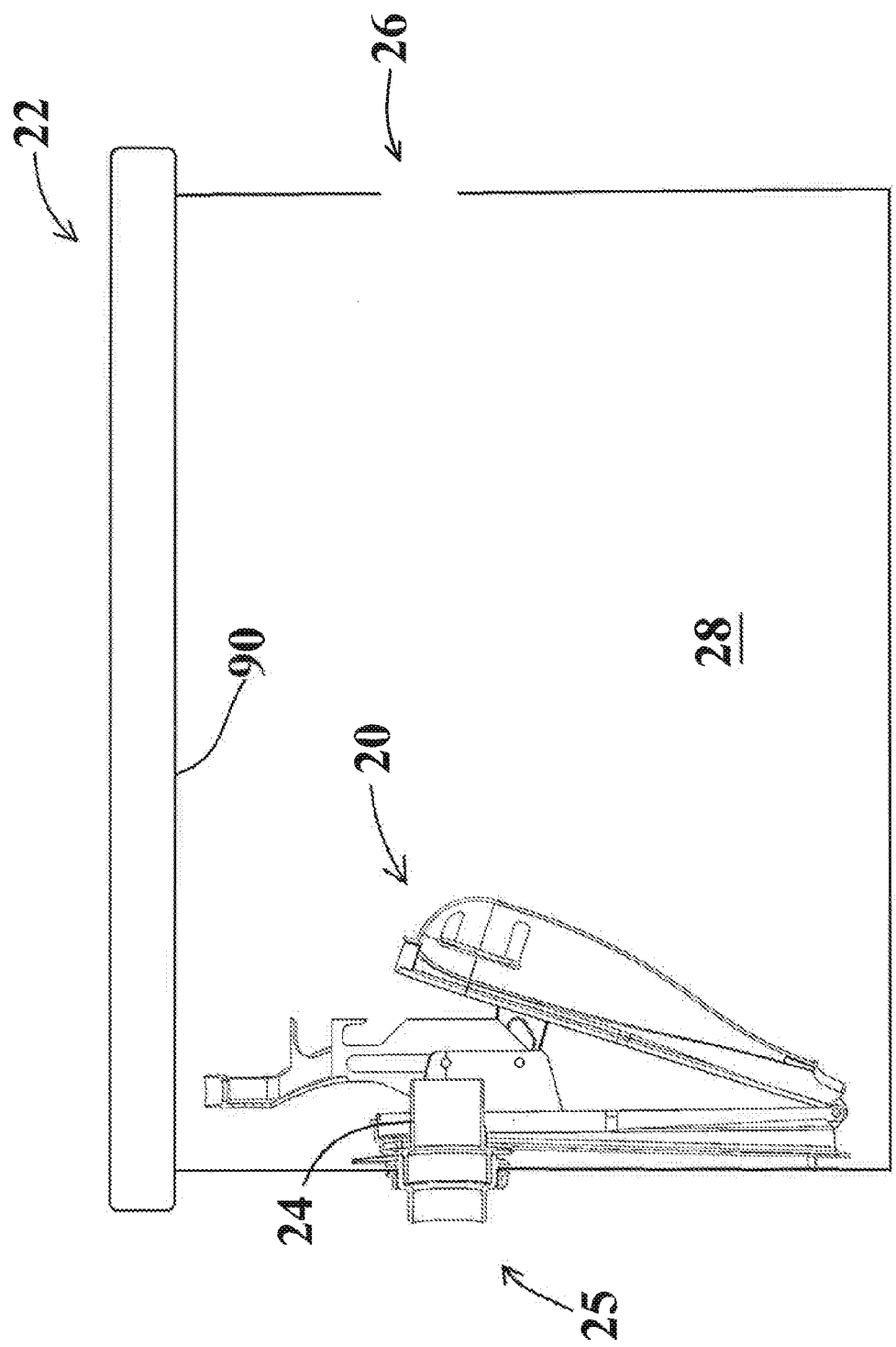
FIG. 18 is a cross-sectional side plan view of an in-line interceptor.

An embodiment of an inlet baffle assembly 20 is shown in FIG. 1-17. The inlet baffle assembly 20 is designed to be used in an in-line interceptor 22 such as is depicted generally in FIG. 18. Referring to FIG. 18, an in-line interceptor or grease interceptor 22 is used to separate fats, oil and grease from wastewater which originates from food preparation kitchens or other facilities. The interceptor 22 has an inflow opening 25 through which influent will pass during operation of the interceptor 22. The interceptor 22 also includes outflow opening 26 and a grease collecting chamber 28 hydraulically located between said inflow opening 25 and said outflow opening 26. A bulkhead fitting 24 is shown connected to the inflow opening 25.

Figure 1:
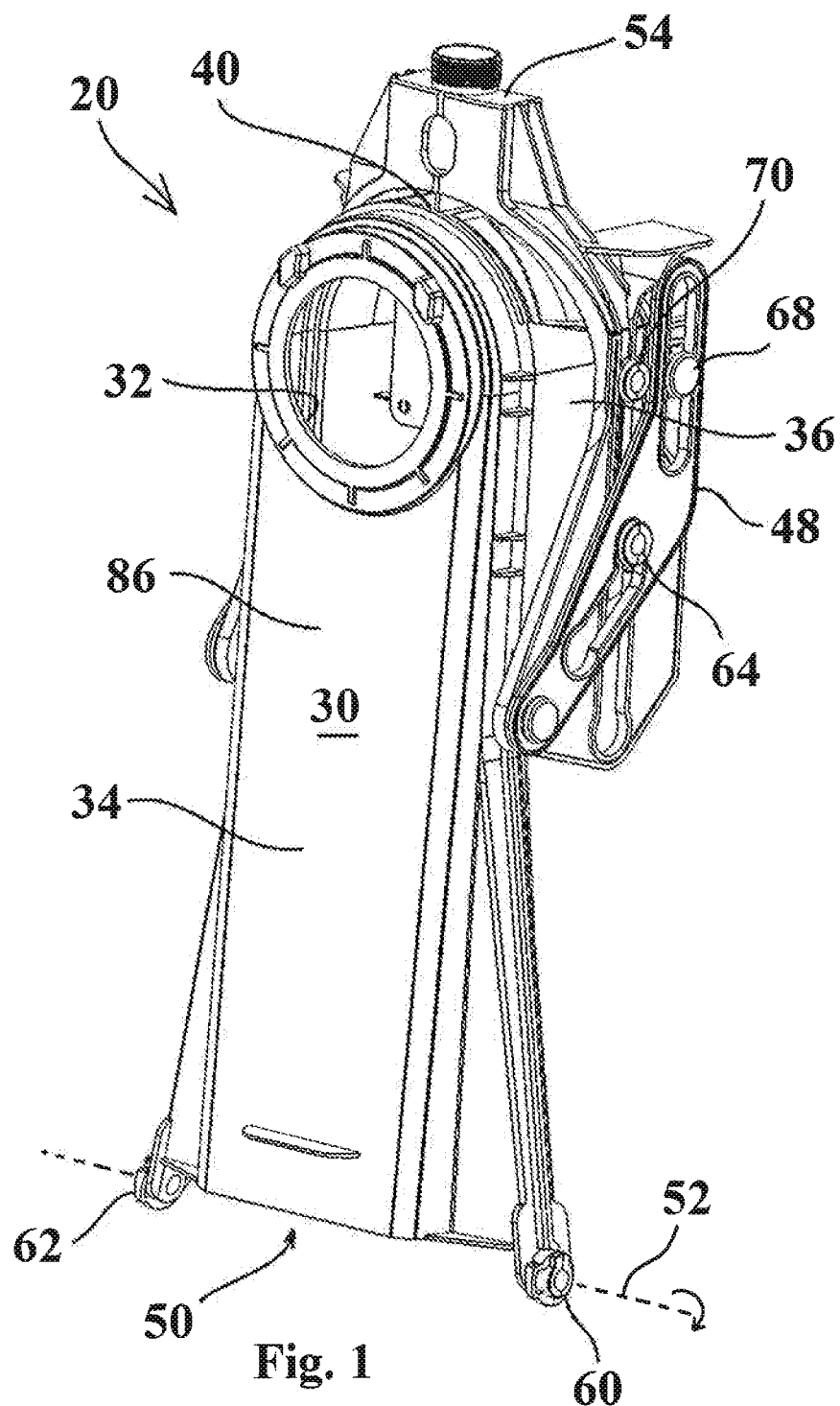
FIG. 1 is a first perspective view from an upstream direction of an embodiment of an inlet baffle assembly in a closed position.

Referring to FIG. 1, the inlet baffle assembly 20 includes an inlet baffle 30 sized and shaped to fit into the grease collecting chamber 28 (FIG. 18). The inlet baffle 30 defines a flow channel to direct the flow of influent into the collecting chamber. The inlet baffle is affixed within the chamber to permit it to do this, for example by being removably affixed to the bulkhead fitting. It will be understood that other means of affixing the inlet baffle in place are also comprehended.

In the embodiment shown in FIG. 1, the flow channel provides a fluid passageway between a baffle opening 32 and an open bottom 50 of the inlet baffle 30. When the inlet baffle 30 is connected to the inflow opening 25 (FIG. 18) of the interceptor 22 (FIG. 18), the flow channel allows influent to pass through the inlet opening 25 and ultimately enter the grease collecting chamber 28. The influent enters the inlet baffle 30 through the inflow opening 25 into the baffle opening 32, through the flow channel and exits the open bottom 50 into the grease collecting chamber. Influent passing through the inflow opening 25 may include wastewater containing FOG and other debris.

Figure 12:
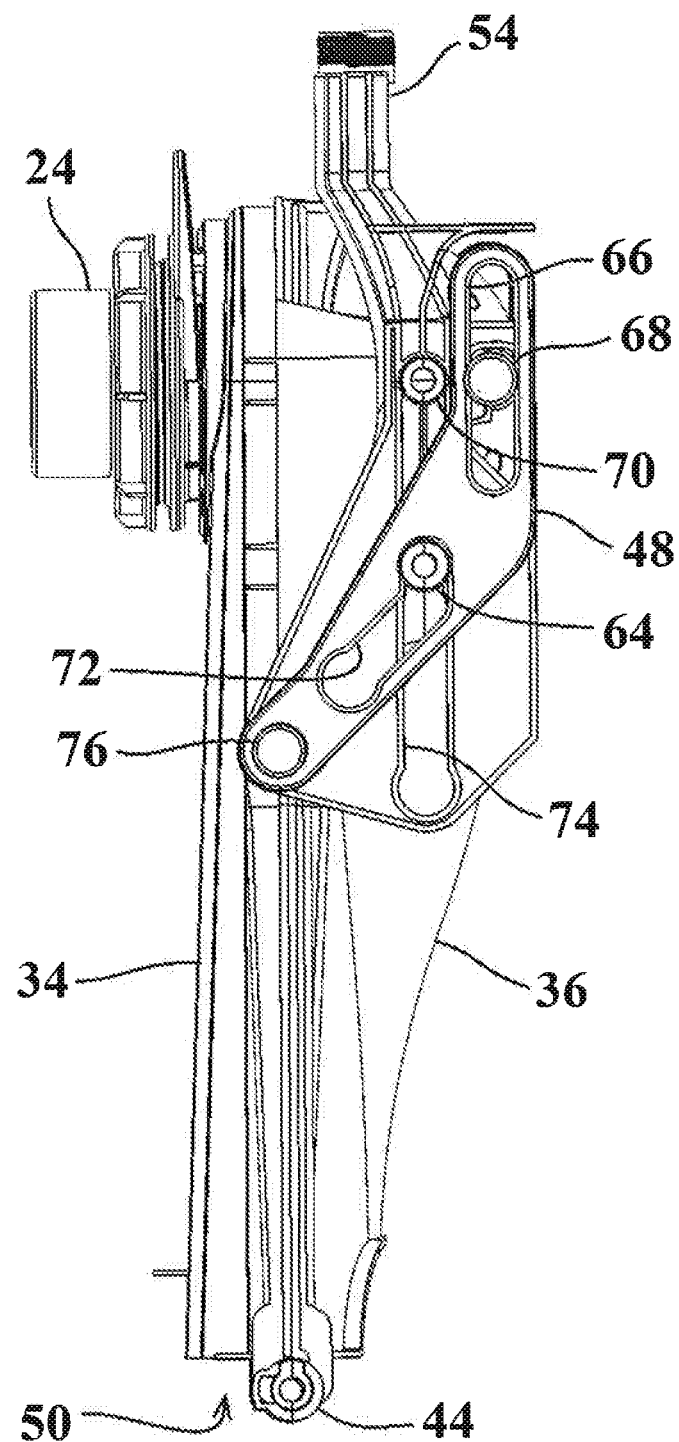
FIG. 12 is a side perspective view of an embodiment of the inlet baffle assembly in a closed position.
Figure 13:
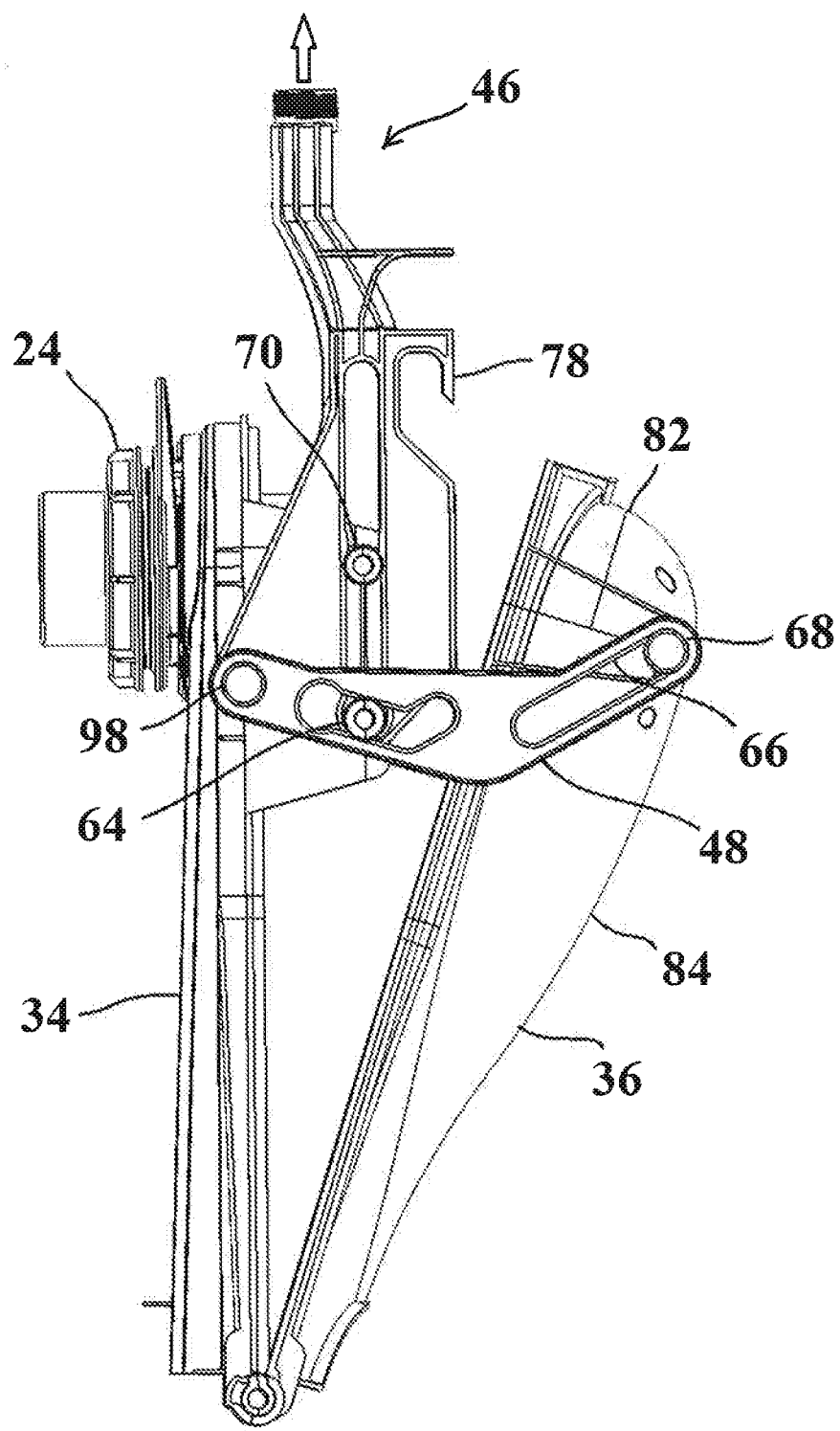
FIG. 13 is a side perspective view of an embodiment of the inlet baffle assembly in an open position.
Figure 14:
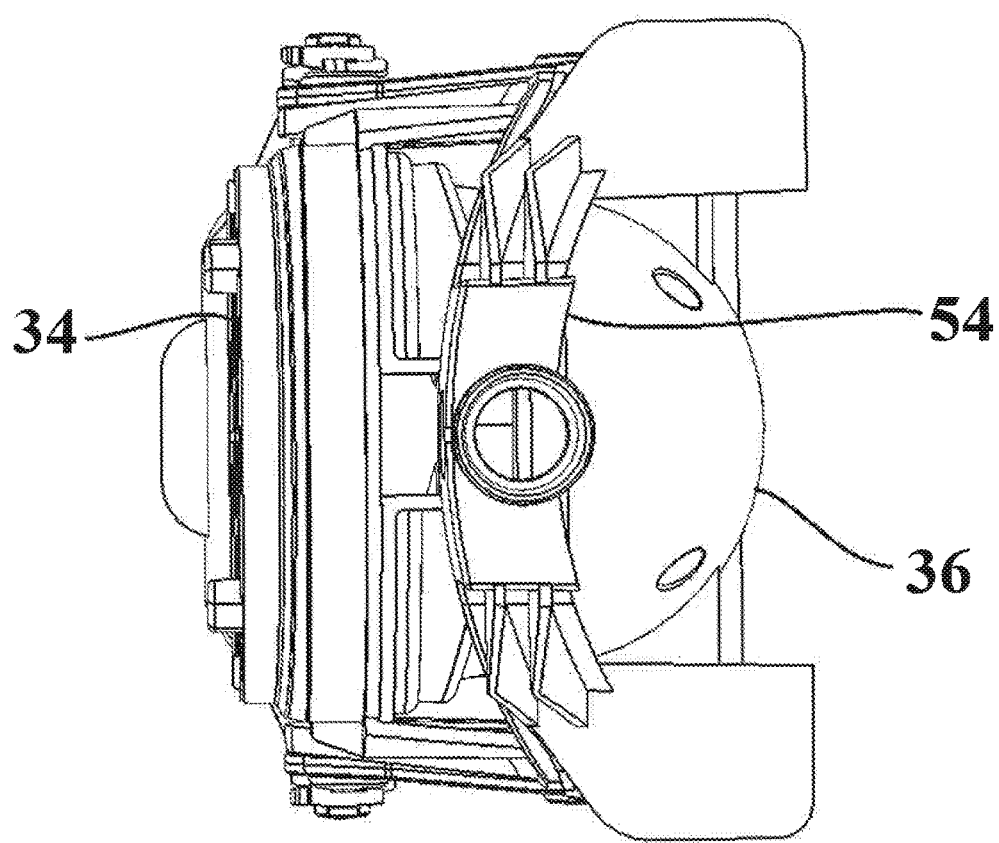
FIG. 14 is a top perspective view of an embodiment of the inlet baffle assembly in a closed position.
Figure 15:
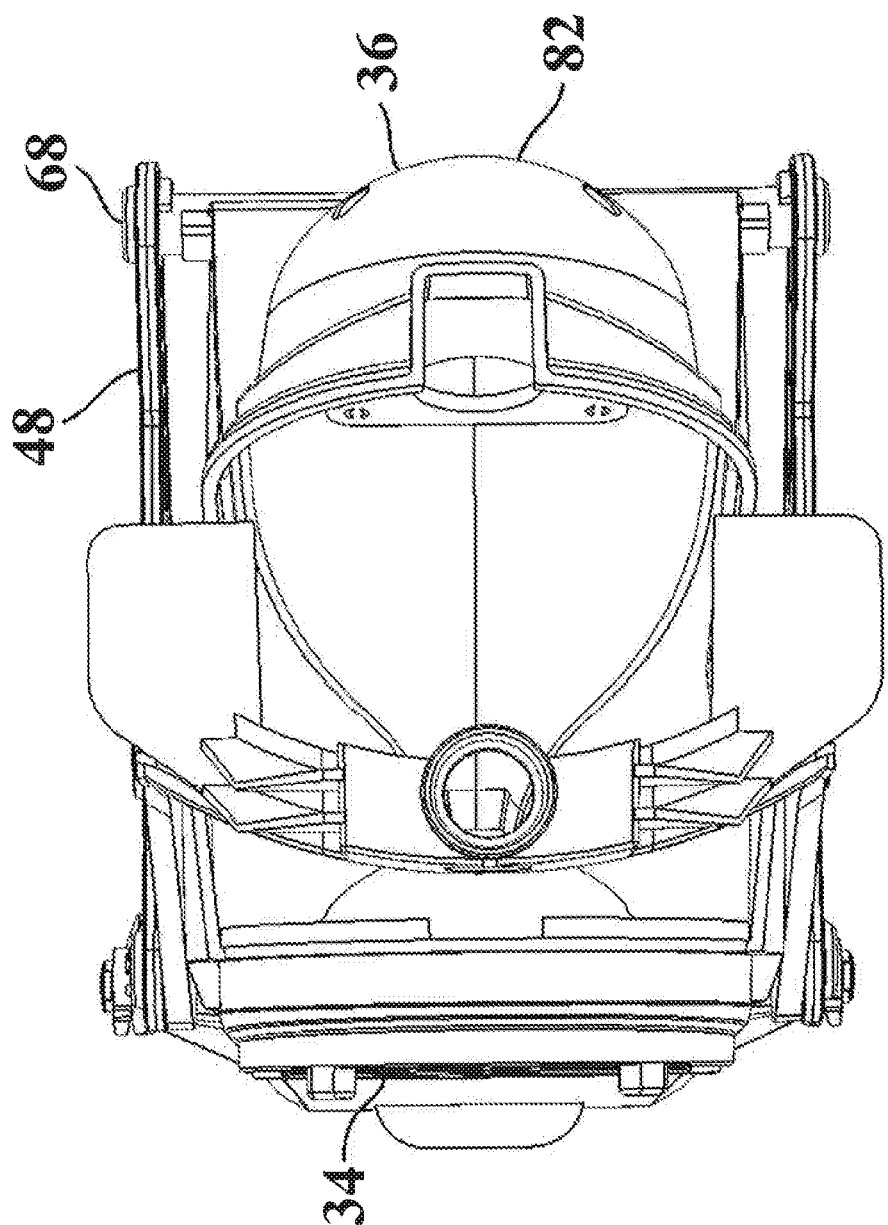
FIG. 15 is a top perspective view of an embodiment of the inlet baffle assembly in an open position.
Figure 16:
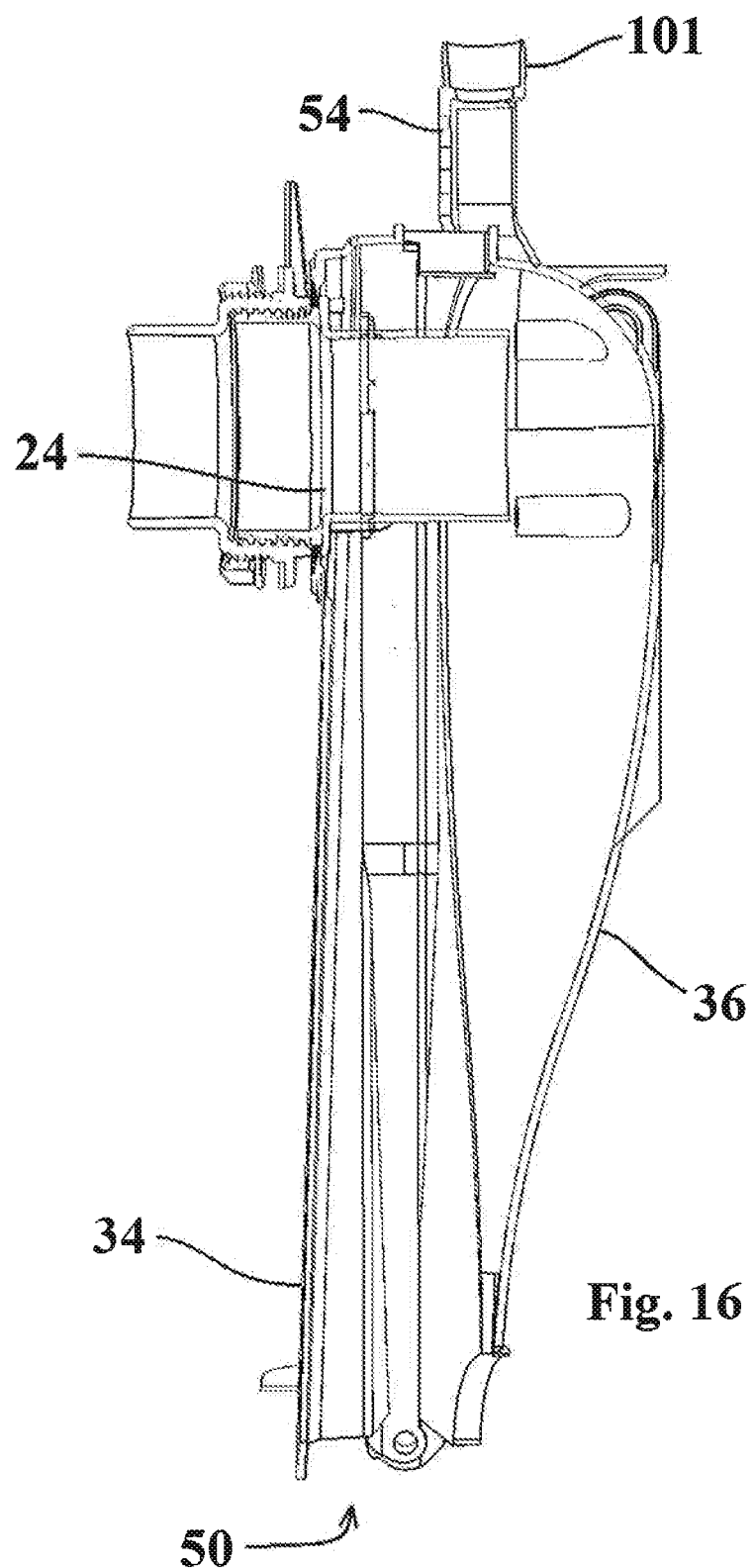
FIG. 16 is a cross-sectional side perspective view of an embodiment of the inlet baffle assembly in a closed position.

The inlet baffle 30 has a nominally fixed section 34 and a moveable section 36. Although the fixed section 34 is described as being 'fixed', it need not be permanently connected to inflow opening 25 (FIG. 18), so long as the moveable section 36 and fixed section 34 are moveable relative to one another. For example, the nominally fixed section 34 may be detachably connected, as described above, to the inflow opening 25 (FIG. 18). Preferably, the moveable section 36 is an elongate moving baffle half and the fixed section 34 is an elongate moving baffle half. However, the moveable section 36 and the fixed section 34 may take various forms and relative portions other than two halves, so long as the moveable section 36 is able to move in such a way that the interior of the inlet baffle is accessible for cleaning and inspection as described below. The relative movement of the moveable section 36 and the fixed section 34 allows the moveable section 36 to move between a closed position as shown in FIGS. 12, 14 and 16 and an open position as shown in FIGS. 13, 15 and 17. When the moveable section 36 is moved into the closed position relative to the fixed section 34, the flow channel is established which allows influent to flow, most preferably, in a controlled manner into the grease collecting chamber. As shown, for example, in FIGS. 12 and 13, the moveable section 36 may be operationally moved in its relative orientation away from the fixed section 34 and into the open position. The fixed section 34 may be affixed, such as by being clamped, retained in a retaining slot or groove, or attached with fasteners or the like, to the bulkhead fitting 24 of the in-line interceptor 22. The fixed section may provide an attachment point for the moveable section 36.

Figure 2:
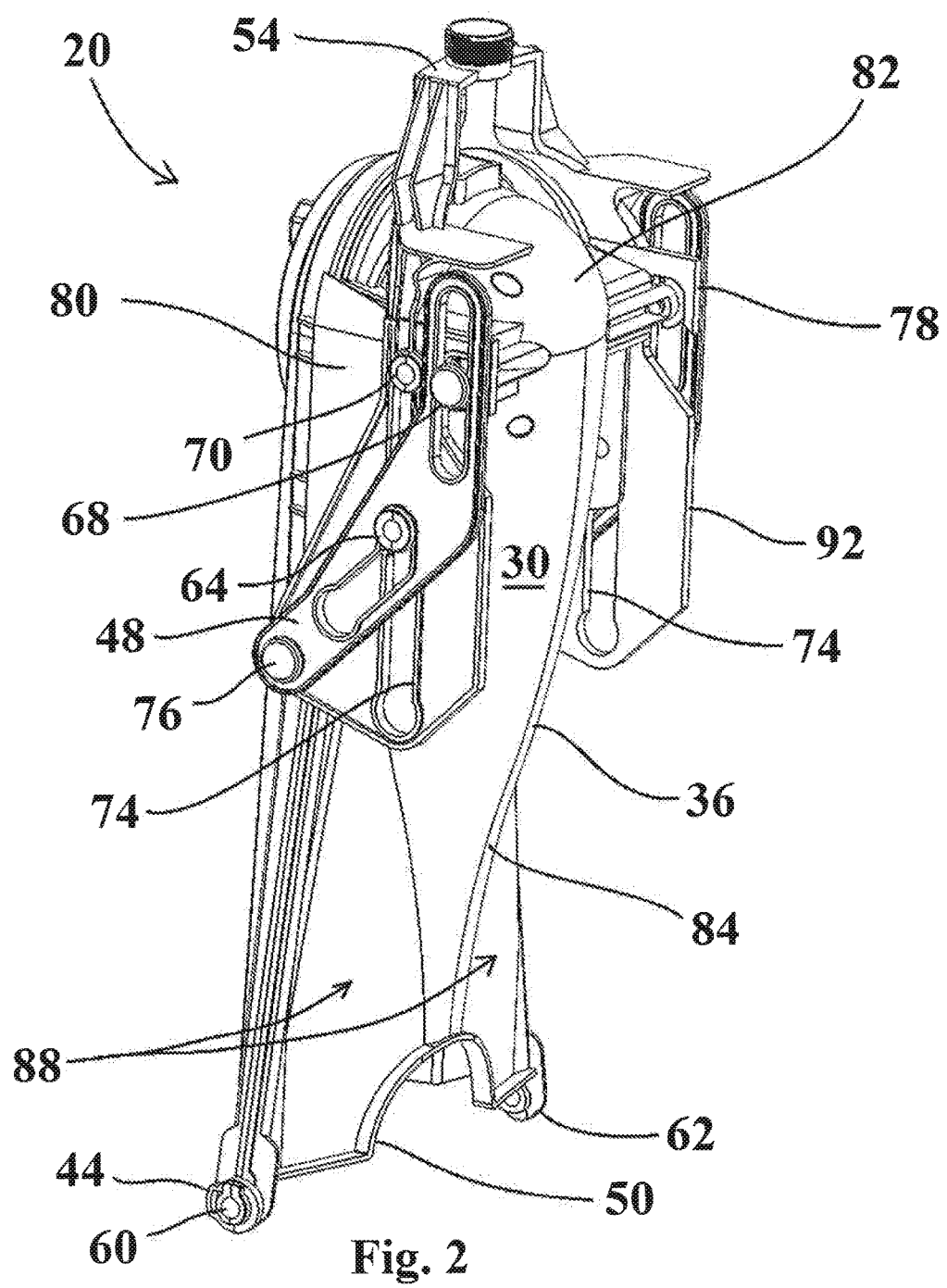
FIG. 2 is a second perspective view from a downstream direction of an embodiment of the inlet baffle assembly of FIG. 1.
Figure 3:
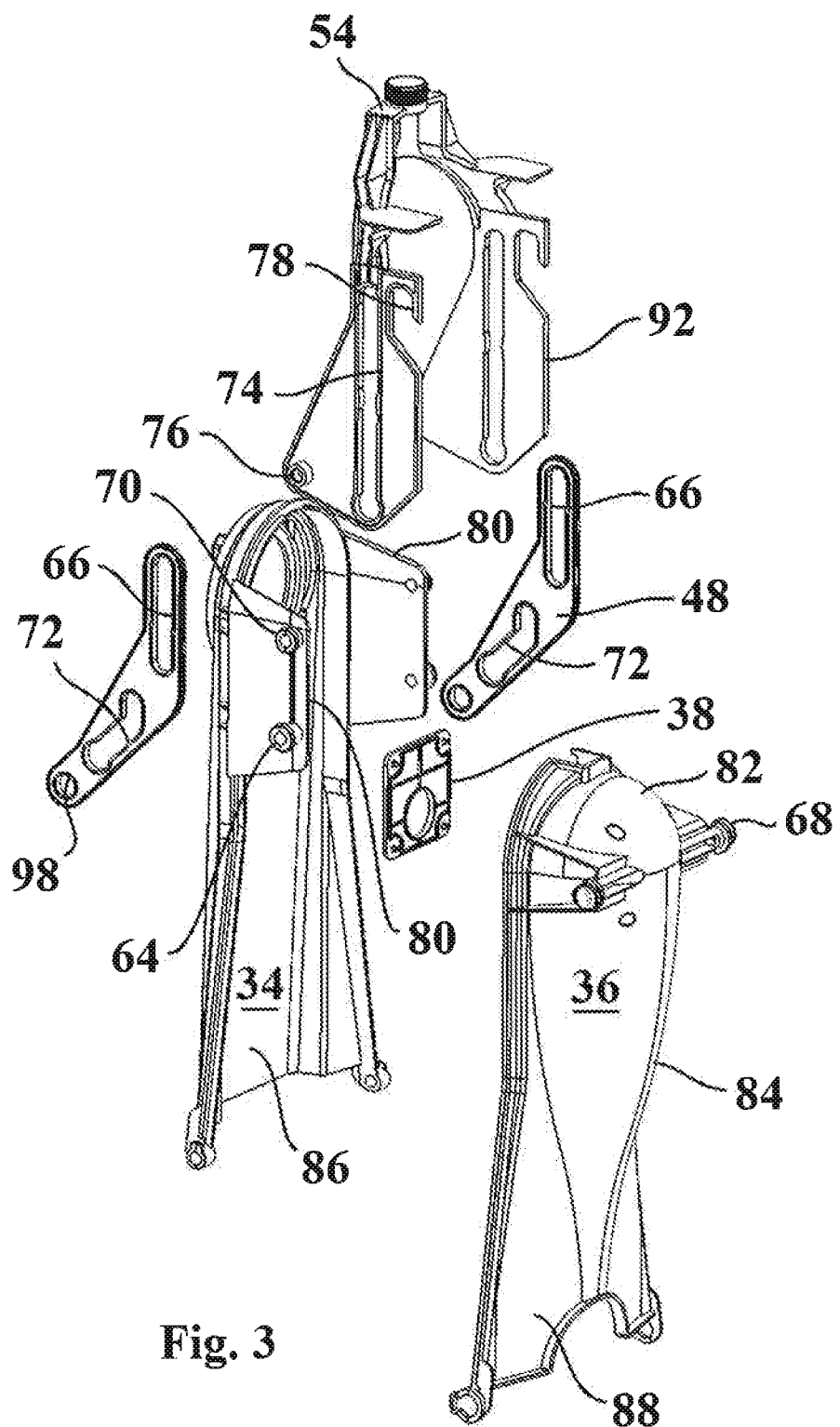
FIG. 3 is an exploded perspective view of an embodiment of the inlet baffle assembly of FIG. 1.
Figure 4:
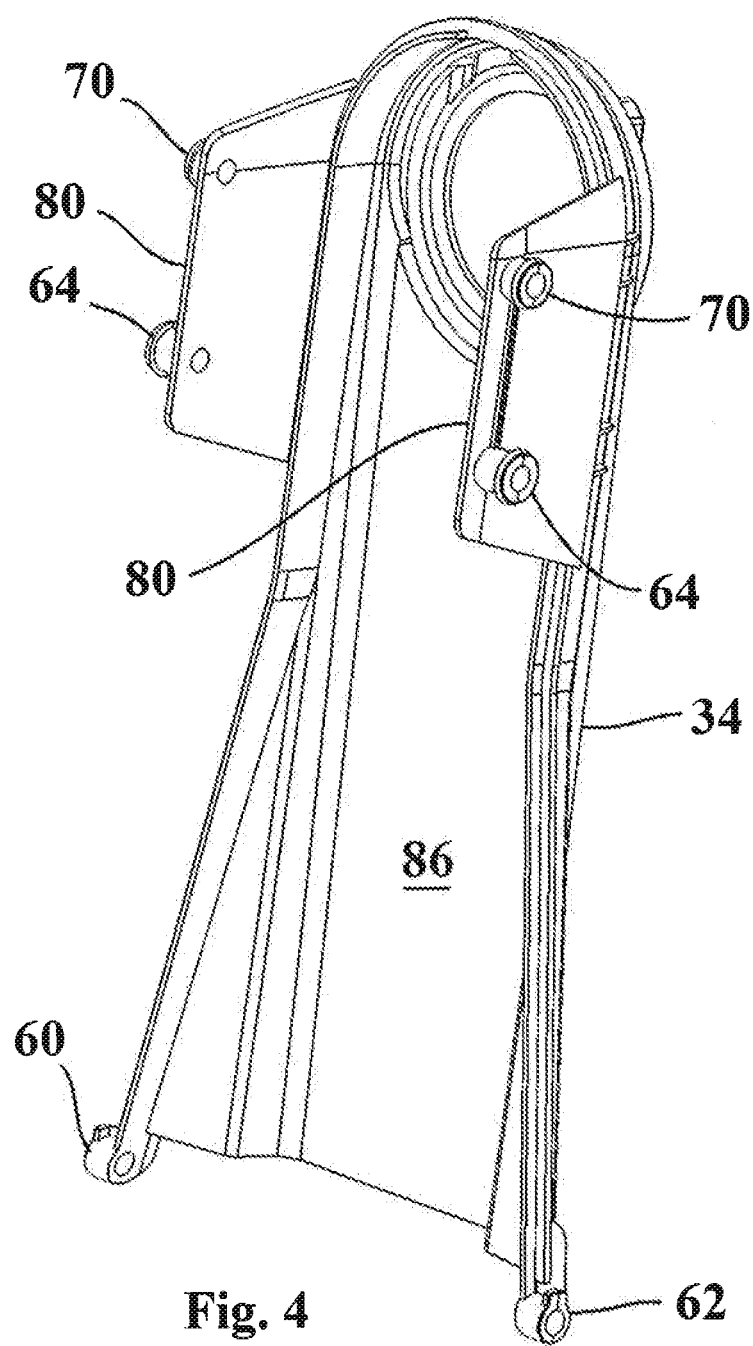
FIG. 4 is a perspective view of an embodiment of a fixed section of the inlet baffle assembly.

Preferably, fixed section 34 and the moveable section 36 are sized and shaped to ultimately produce laminar flow of influent through the grease collecting chamber when the moveable section 36 is in a closed position. A laminar flow is preferred to optimize the separation of solids, FOG and wastewater as the fluid passes through the chamber from the inlet side to the outlet side. The flow through the inlet baffle 30 may be partially controlled by the shapes of each of the fixed section 34 and the moveable section 36. As shown in FIG. 2, the moveable section 36 includes a generally cylindrical upper section 84 and flat sections 88 at the base. The upper section 84 has a rounded top 82. The fixed section 34 has a unitary flat section 86 as shown in FIG. 3. The assembly 34 when in the closed position seeks to do the following: initially turbulently mix the influent so as to entrain air via the opening 40 (FIG. 6) this air being drawn in through the opening 40 under negative pressure created by flow as it accelerates through the flow control orifice 58 (FIG. 8) and into turbulence. On passing through the flow control orifice, influent continues downward through the inlet baffle assembly being initially influenced by the more cylindrical form of the upper portion 84 and then transitioning to the more linear form enclosed by the flat areas 88 and 86 (FIG. 3). During this transition the flow area increases to slow the flow speed and the smooth baffle shape and reduced flow speed help re-establish laminar flow. Other shapes are comprehended for the baffles provided that laminar flow is re-established after the turbulent air mixing and entraining section above.

Figure 8:
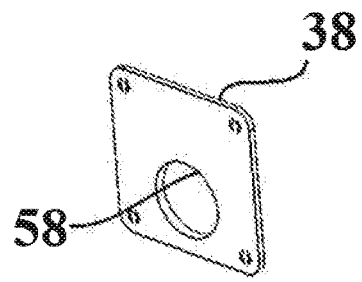
FIG. 8 is a side perspective view of an embodiment of a flow control component of the inlet baffle assembly.
Figure 7:
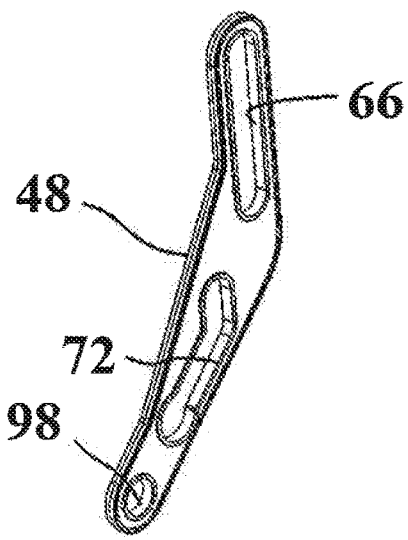
FIG. 7 is a side perspective view of an embodiment of a link arm of the inlet baffle assembly.

Referring to FIGS. 8 and 17, the inlet baffle 30 includes a flow control element 38 associated with the inlet baffle 30 to control the rate of flow of influent entering the flow channel when the moveable section 36 is in the closed position. Preferably, the flow control element 38 further comprises a flow control orifice 58. Alternate shapes and designs for flow control element 38 may be used so long as the rate of fluid flow into the system can be adequately controlled. For example, the flow control element may take the form of a flow control plate.

Referring to FIG. 17, the flow control element 38 is positioned to be accessible for cleaning and inspection when the moveable section 36 is in the open position. Preferably, the flow control element 38 is fixed to the moveable section 36 of the inlet baffle 30 so that the flow control element 38 moves away from the fixed section 34 of the inlet baffle 30 when the moveable section 36 is moved from the closed position to the open position, permitting access to the upstream side of the flow control element 38 and internal surfaces of the inlet baffle assembly 20 for cleaning. It will be understood that material which can block the opening in the flow control element will generally originate upstream. Thus, if, for example, an upstream sink has poor drainage, the sink user can simply go to the inline waste interceptor, open it, pull up the inlet baffle actuator as described herein, and get access to the flow control element 38, for prompt cleaning.

Figure 5:
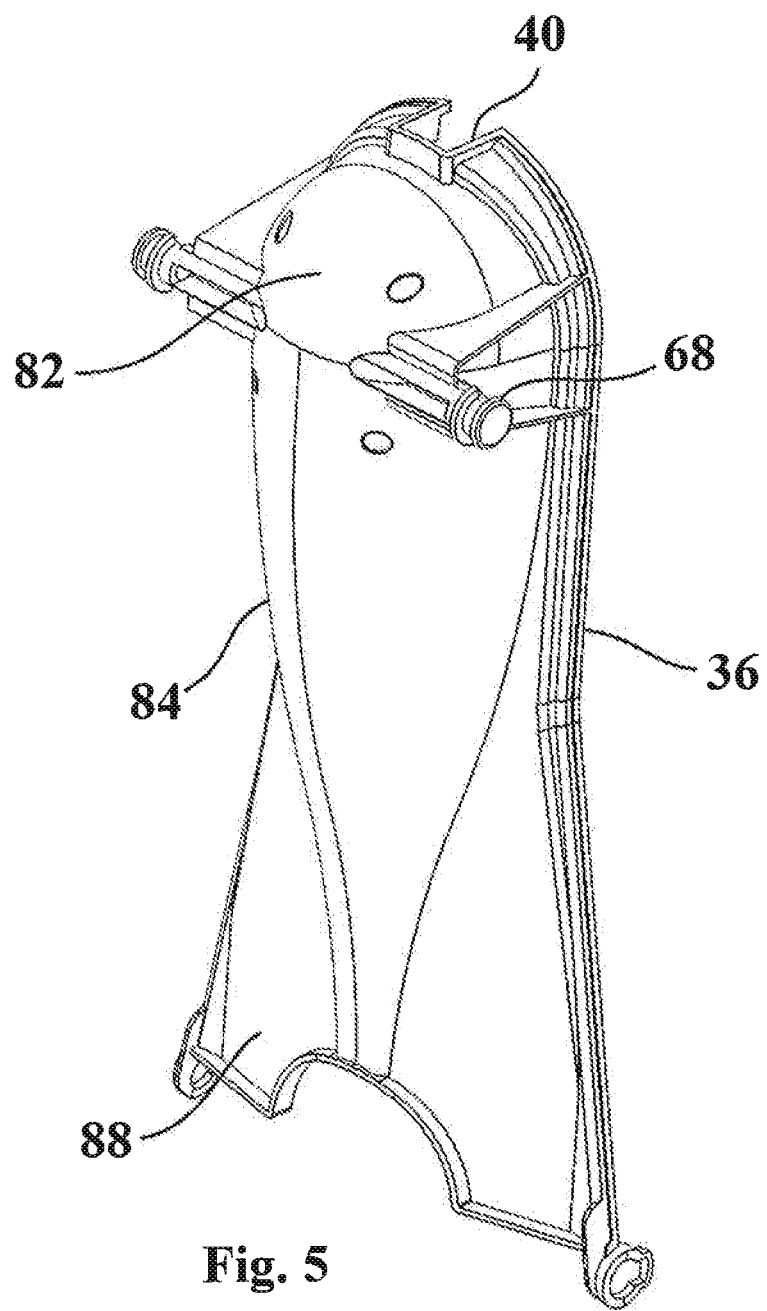
FIG. 5 is a first perspective view of an embodiment of a moveable section of the inlet baffle assembly.
Figure 6:
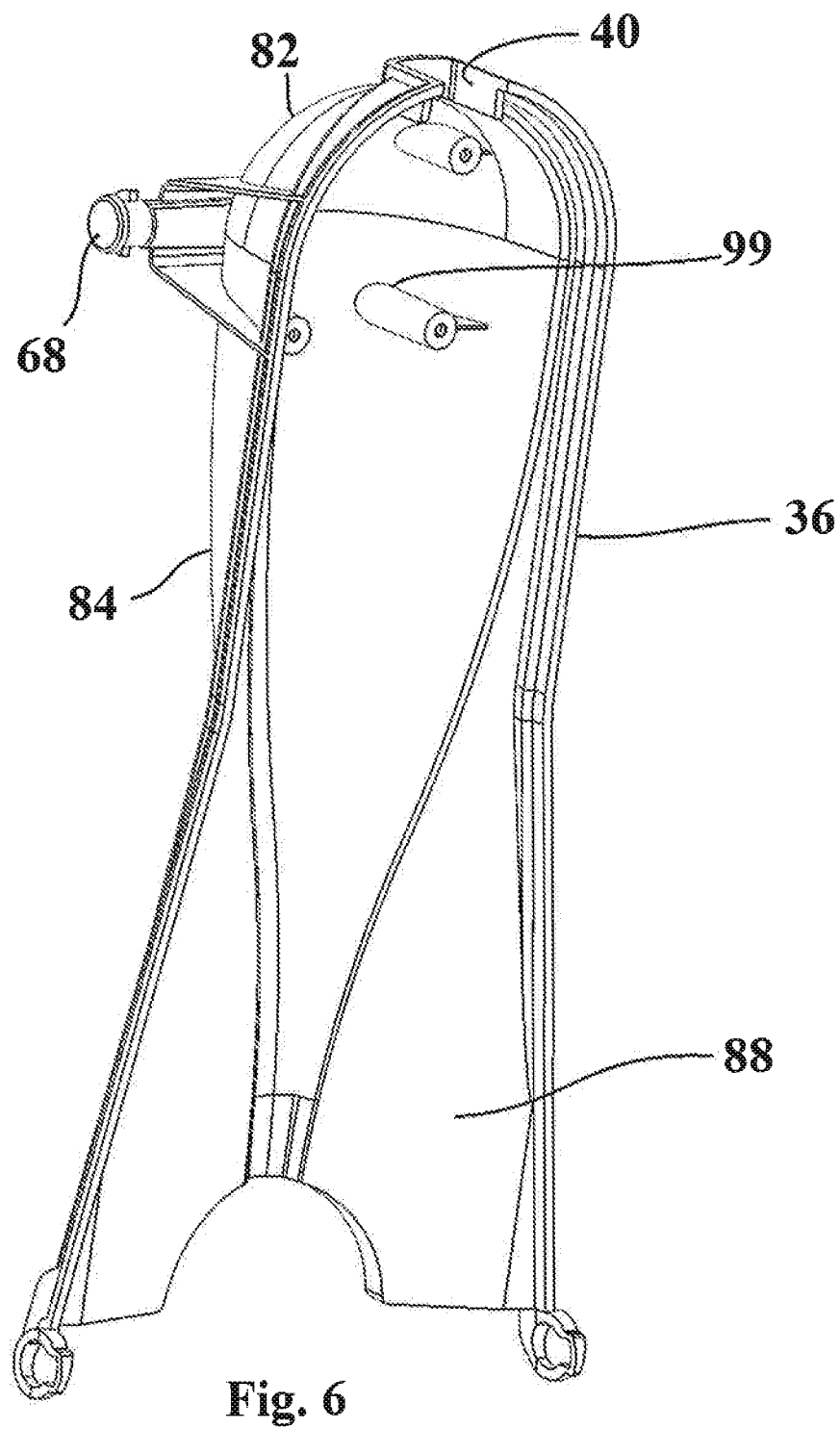
FIG. 6 is a second perspective view of the embodiment of the moveable section of the inlet baffle assembly of FIG. 5.

The orifice 58 can be provided in a range of different sizes, where the specific size is appropriate for a specific design inlet flow and/or to comply with regulatory requirements. When the moveable section 36 is moved to an open position, obstructions within the upstream baffle retainer 100 (FIG. 17) and the inlet baffle 30, including at the flow control element 38, may be cleared passively, through the flow of released, back-up wastewater, or actively, by physical cleaning by an operator. As shown in FIGS. 1 and 5, the inlet baffle assembly 20 includes an integrated air intake 40 to facilitate entrainment of air into the influent flow. Air entrainment is desirable to allow buoyant bubbles of air to adhere to droplets of oil, thereby causing them to rise or separate more quickly when in the chamber. Thus, the initial part of the flow through the inlet opening, through the flow control element and then down the baffle past the air intake 40 is most preferably somewhat turbulent to encourage mixing of air into the influent as described above.

In the embodiment of FIG. 1, the integrated air intake 40 is illustrated by a single opening and is preferably located above the operational static water level of the interceptor 28 positioned generally in the upper portion of the moveable section 36. The integrated air intake 40 may take a variety of different forms (such as one or more openings) and need not be located within the moveable section 36 provided that the air intake 40 allows air to enter the influent flow from outside the inlet baffle assembly 20 and most preferably in a way that lets the air combine with a turbulent influent. For example, the inlet interceptor 22 may be a closed compartment having a lid 90 (FIG. 18) and having an atmospherically balanced and vented environment from which air may be entrained into the air intake 40. In other words, air is mixed with the influent air, and then allowed to bubble up and resupply the air space above the fluid level in the chamber. The integrated air intake 40 is preferably located on an upper portion of the inlet baffle 30 to ensure that the air intake 40 generally lies above the fluid level in the interceptor 22. Although in the embodiment shown, the air intake 40 is shown as a single linear detail, the air intake 40 may also include a different arrangement or number of holes which may have a variety of different shapes or sizes. Furthermore, the air intake 40 may also be placed on a different component of the inlet baffle 30, such as the fixed section 34, or on both the fixed section 34 and the moveable section 36, so long as the air intake 40 provides a mechanism for introducing air into the influent liquid in a turbulent portion of flow to assist in the formation of bubbles to aid hydromechanical separation of the FOG from the influent.

Figure 10:
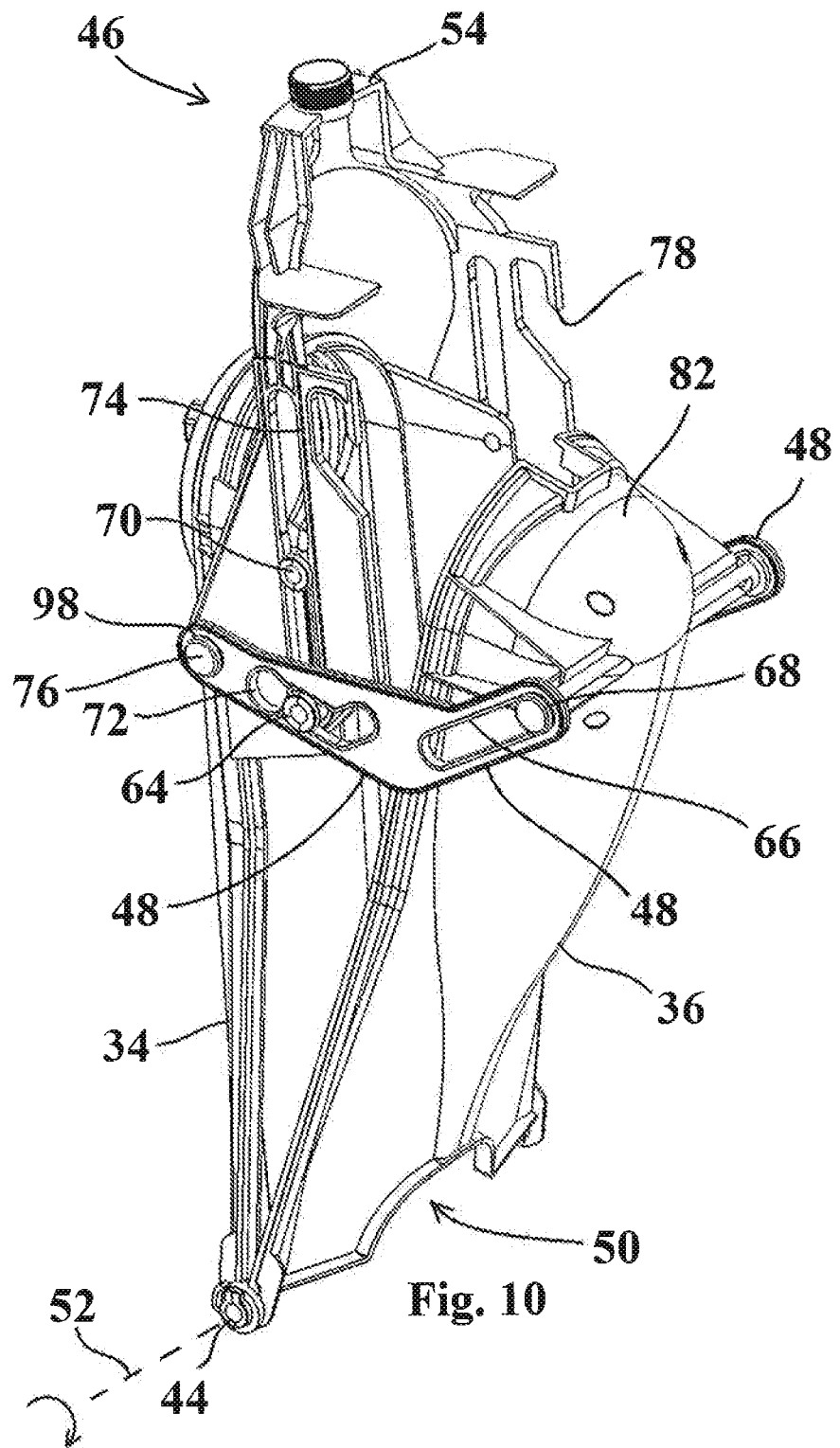
FIG. 10 is a first perspective view of an inlet baffle assembly in an open position viewed from downstream.
Figure 11:
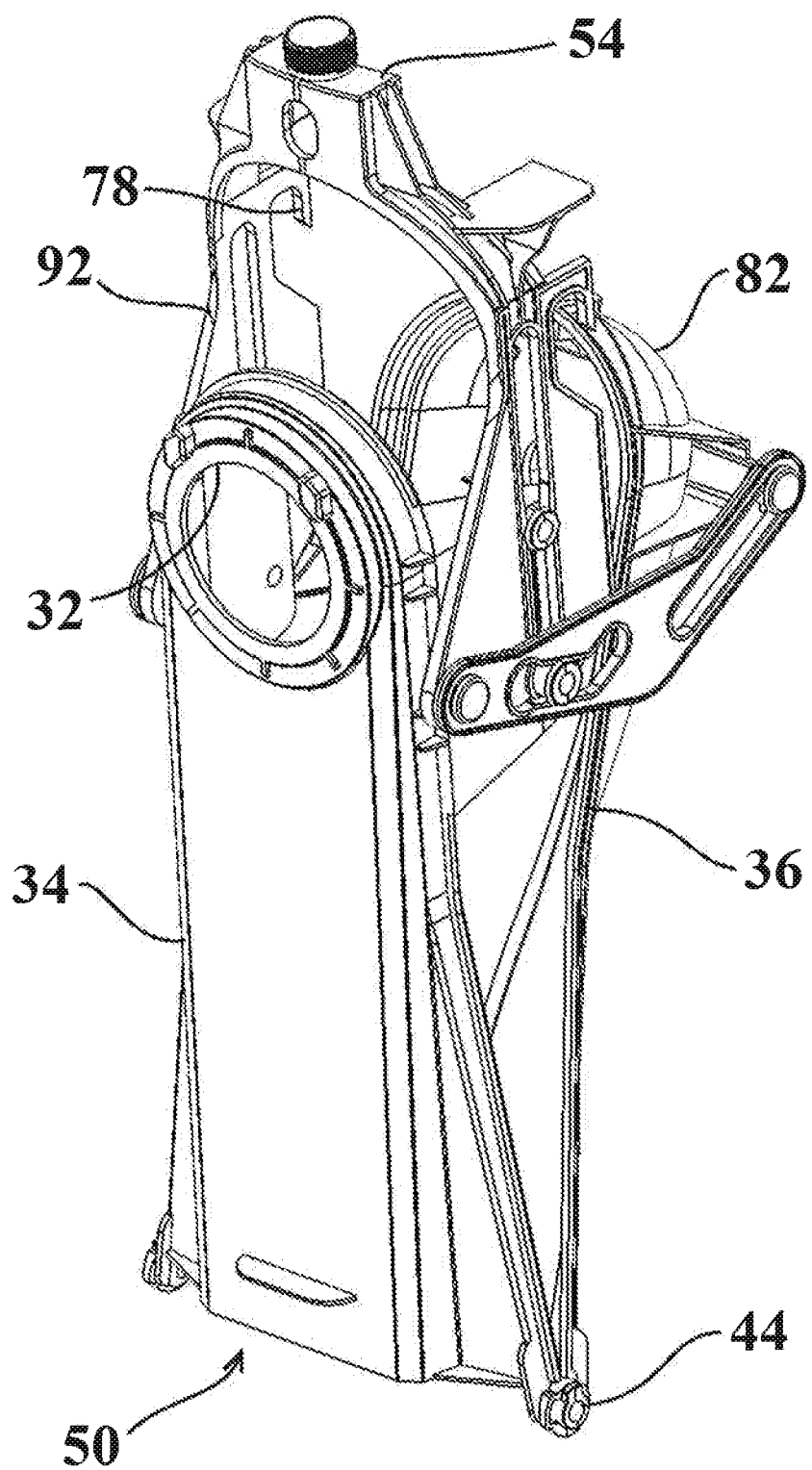
FIG. 11 is a second perspective view of the inlet baffle assembly of FIG. 10 in an open position, viewed from upstream.

As shown in FIG. 10, the hinge pins 60 and 62 (FIG. 2) are integrated to fixed section 34. The pins 60, 62 are moveably connected to opposed receiving details 44 on moveable section 36. The hinge details 44 define a rotational axis 52 which is adjacent the open bottom 50. An actuator assembly 46 is connected between the fixed section 34 and the moveable section 36 of the inlet baffle 30. When actuated, the actuator assembly 46 moves the moveable section 36 between the open position and the closed position. Preferably, the actuator assembly 46 is manually operable and is comprised of link arms 48 and an actuator component 54 which are operatively connected between the fixed section 34 and moveable section 36 of the inlet baffle assembly 30. The actuator component 54 may be in the form of a pull handle. The link arms 48 include slots 66 which interface with pins 68 on the moveable section 36 and slots 72 which interface to pins 64 on the fixed section 34. The fixed section 34 includes extension features 80 (FIG. 4) which each extend perpendicularly from the unitary flat section 86 of the fixed section 34. Each extension feature 80 includes one of each pair of pivot points 64 and 70.

Figure 9:
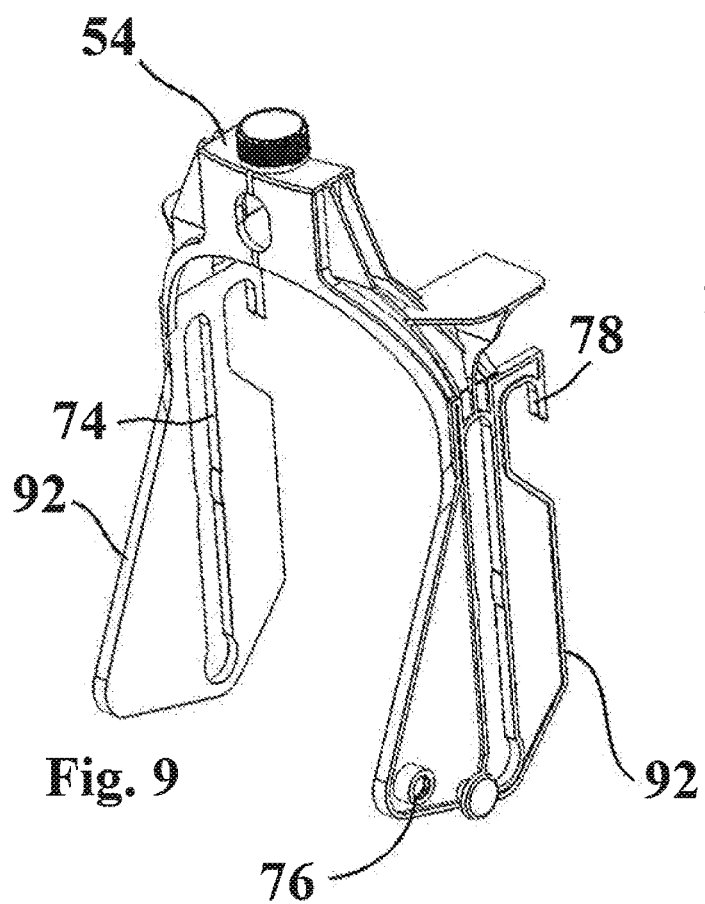
FIG. 9 is a side perspective view of an embodiment of an actuator component of the inlet baffle assembly.

As shown in FIG. 9, the handle 54 includes a connecting element 92 on each side of the handle 54. Each connecting element 92 has an elongate slot 74 which interfaces with pivots 64 and 70 on the fixed section 34. As shown in FIG. 10, at the base of each connecting element 92 is a pivot 76 which interfaces to a corresponding pivot hole 98 in each of the link arms 48. The link arms 48 allow the moveable section 36 to rotate about axis 52 and tilt away from the fixed section 34 to an open position, opening the inlet baffle 30 and exposing the upstream face of the flow control element 38 and allowing obstructions to be cleared as previously described.

As shown in FIG. 2, the hinged attachment 44 includes a pair of hinge pins 60, 62, on opposite sides of each of the fixed section 34 and the moveable section 36, which also allow the moveable section 34 to pivot away from the inflow opening 100 (FIG. 17). As shown, the hinged attachment is placed at the bottom of the baffle assembly. This permits the top to open when the baffles are hinged apart. While this is the most preferred form of the present invention, other hinged positions and configurations are also comprehended. All that is required is an actuator component which is clear of the influent and retained fluids, and which can open the moveable baffle to permit the visual inspection and then cleaning of the flow control element as needed.

As shown in FIG. 3, the actuator component 54 provides a mechanism for maneuvering the link arms 48 and causes the inlet baffle to move between the open position and the closed position as the actuator component 54 is raised and lowered, respectively. The actuator component 54 includes catch hooks 78 which interface with pins 68 to lock the moveable section 36 into the closed position to allow the assembly to stay closed against the force of any inlet fluid flow. The pins 68 also provide extension limits within slots 66 (FIG. 3) to control the maximum degree of openness. Although pivoting displacement provides good results, other forms of displacement are also comprehended. For example, the moveable section could be translated straight up on guides, or straight out. As well the moveable section could be completely detachable rather than being pivotally attached. All that is required is that the upstream side of the flow control element is exposed for ease of cleaning.

In operation, the interior of the inlet baffle assembly 20 can be cleaned by moving the moveable section 36 into the open position as shown in FIGS. 13, 15 and 17 and by cleaning the inlet baffle assembly 20 while the moveable section 36 is in the open position. After being cleaned, the moveable section 36 is moved back into the closed position as shown in FIGS. 12, 14 and 16 in order to facilitate fluid flowing through the inlet baffle assembly 20 into the grease collecting chamber 28. The actuator 54 is moved in a vertical plane to move the moveable section 36 between the open position and the closed position. The actuator assembly 46 may be actuated by manually operating the handle 54. The flow control element 38 moves away from the baffle retainer component 100 (FIG. 17) when the moveable section 36 is moved into the open position, allowing backed-up wastewater and debris to flow into the grease collection chamber 28 which may be cleared using a pump for removal, for example.

The operation of the actuator assembly 46 can be understood with reference to FIGS. 12 and 13. To open the inlet baffle, an operator pulls the actuator component 54 either by hand or with an implement so that the catch hooks 78 are lifted from the pins 68. When lifted, the actuator component 54 moves upwards vertically. The motion of the handle 54 upwards causes the pivot 76 and pivot hole 98 to move upwards which in turn results in the upper end of the link arms 48 moving away from the fixed section 34. The moveable section 36 thereby moves apart at the top from the fixed section 34. The interaction between the elongate slots 74 and the pins 64 and 70 on the fixed section 34 restrict the relative motion of the actuator component 54 in a vertical direction. The pins 64 and 68 move within the slots 72 and 66, respectively of the link arms 48 as the actuator component 54 is lifted. As shown in FIG. 17, in the open position, the moveable section 36 exposes the upstream face of the flow control element 38 from its position pressed against the inlet baffle retainer component 100. Once cleaned, the inlet baffle may be closed by the operator pushing down on the actuator component 54, either by hand or using an implement which draws the moveable section 36 and fixed section 34 together until the catch hooks 78 are locked into place on the pins 68. The mechanism will stop when fully closed. An implement may be desirable to actuate the actuator assembly 46 when the inlet baffle assembly 20 is installed at greater than arm's length from the point of access of the operator. Detail 101 (FIG. 16) provides an attachment feature integrated with pull handle 54.

The inlet baffle assembly 20 may be constructed from a broad range of materials including but not limited to moulded or formed plastic.

In the claims, the word "comprising" is used in its inclusive sense and does not exclude other elements being present. The indefinite article "a" before a claim feature does not exclude more than one of the feature being present.

It will be appreciated that the foregoing description is intended by way of example only and that many variations and modifications to the invention are comprehended without departing from the scope of the claims which are attached. Some of these variations are discussed above and others will be apparent to those skilled in the art. For example, while the preferred form of the invention is moulded plastic, metal or other materials could also be used. However, plastic is preferred for its low cost, and ease of manufacture among other reasons.

We claim:

1. An inlet baffle assembly for use in an in-line interceptor used to separate fats, oil and grease from wastewater, said interceptor having a wastewater inflow opening through which influent will pass, an outflow opening and a grease collecting chamber hydraulically located between said inflow opening and said outflow opening, said inlet baffle assembly comprising:
   an inlet baffle sized and shaped to fit within said grease collecting chamber, the inlet baffle defining a flow channel connected to the inflow opening through which influent enters the grease collecting chamber, the inlet baffle comprising an elongate fixed baffle half adapted to connect to the inflow opening, and an elongate moveable baffle half associated with the elongate fixed baffle half to allow the elongate moveable baffle half to be moved away from the elongate fixed baffle half between an open position and a closed position, the flow channel being formed between the elongate fixed baffle half and moveable baffle half when the elongate moveable baffle half is in the closed position; and
   a flow control element associated with said inlet baffle assembly to control the rate and flow characteristics of influent entering the flow channel when the elongate moveable baffle half is in the closed position, said flow control element being positioned to be accessible for cleaning or inspection when the elongate moveable baffle half is in the open position.

2. The inlet baffle assembly of claim 1, further comprising an integrated air intake to facilitate entrainment of air into said influent flow.

3. The inlet baffle assembly of claim 1, further comprising a hinge detail operationally related to said elongate moveable baffle half and said elongate fixed baffle half.

4. The inlet baffle assembly of claim 1, wherein the inlet baffle further comprises an open bottom.

5. The inlet baffle assembly of claim 4, further comprising a hinge detail integrated attachment connected to said elongate moveable baffle half and said elongate fixed baffle half, the hinge detail being pivoted around a rotational axis and in which the rotational axis of the hinged attachment is adjacent the open bottom.

6. The inlet baffle assembly of claim 1, further comprising an actuator connected between the elongate fixed baffle half and the elongate moveable baffle half of the inlet baffle wherein the actuator moves the elongate moveable baffle half between the open position and the closed position.

7. The inlet baffle assembly of claim 6, wherein the actuator is manually operable and is comprised of link arms and an actuator component which are operatively connected between the elongate fixed baffle half and elongate moveable baffle half of the inlet baffle.

8. The inlet baffle assembly of claim 7, further comprising a removeable handle extension to facilitate manual actuation of said handle in a below-grade in-line interceptor.

9. The inlet baffle assembly of claim 1, wherein the flow control element further comprises a flow control plate including an orifice.

10. The inlet baffle assembly of claim 1, wherein the flow control element further comprises a flow control plate fixed to the elongate moveable baffle half of the inlet baffle so that the flow control plate moves away from the elongate fixed baffle half of the inlet baffle when the elongate moveable baffle half is moved from the closed position to the open position to permit access to an inflow opening, the flow control element and internal surfaces of the inlet baffle assembly for cleaning.

11. The inlet baffle assembly of claim 1, wherein the elongate fixed baffle half and the elongate moveable baffle half are sized and shaped to produce a laminar flow of influent with reduced velocity into the grease collecting chamber.

12. The inlet baffle assembly of claim 1, wherein the inlet baffle and the flow control element are formed from a plastic material.

13. The inlet baffle assembly of claim 1, further comprising guide tabs for locating said inlet baffle assembly within said in-line interceptor.

14. The inlet baffle assembly of claim 13, wherein said guide tabs are sized and shaped to be received in vertical guide slots on said in-line interceptor.

15. The inlet baffle assembly of claim 1, wherein said flow control element includes both a flow restricting orifice and a flow deflector to direct flow within said inlet baffle.

16. A method of cleaning an inlet baffle assembly in an in-line interceptor, said interceptor having an inflow opening through which influent will pass, an outflow opening and a grease collecting chamber hydraulically located between said inflow opening and said outflow opening, the method comprising:

providing an inlet baffle assembly within the in-line interceptor, and connecting the inlet baffle assembly to the inflow opening, the inlet baffle assembly defining a flow channel through which influent from the inflow opening enters the grease collecting chamber, the inlet baffle assembly comprising:

(a) an elongate fixed baffle connected to the inflow opening, and an elongate moveable baffle half associated with the elongate fixed baffle half to allow the elongate moveable baffle half to be moved away from the elongate fixed baffle half between an open position and a closed position, the flow channel being formed between the elongate fixed and moveable baffle halves when the elongate moveable baffle half is in the closed position; and (b) a flow control element associated with said inlet baffle assembly to manage the rate of flow of wastewater through the flow channel when the elongate moveable baffle half is in the closed position, the flow control element being positioned to be accessible for cleaning when the elongate moveable baffle half is in the open position; moving the elongate moveable baffle half into the open position;

cleaning the inlet baffle assembly while the elongate moveable baffle half is in the open position; and moving the elongate moveable baffle half into the closed position in order to facilitate fluid flowing through the inlet baffle assembly into the grease collecting chamber.

17. The method of claim 16, wherein the inlet baffle assembly further comprises an actuator connected between the elongate fixed baffle half and the elongate moveable baffle half of the inlet baffle, and the method further comprising actuating the actuator to move the elongate moveable baffle half between the open position and the closed position.

18. The method of claim 17, wherein the actuator is further comprised of link arms and a handle and the method further comprising manually operating the handle to move the elongate moveable baffle half between the open position and the closed position.

19. The method of claim 17, wherein the flow control element further comprises a flow control plate and the method further comprising moving the flow control plate away from the elongate fixed baffle half of the inlet baffle assembly when the elongate moveable baffle half is moved into the open position.

20. The method of claim 16, wherein cleaning the inlet baffle assembly while the elongate moveable baffle half is in the open position further comprises allowing backed-up wastewater and debris to flow into the grease collection chamber when the moveable section is in the open position.

21. An inlet baffle assembly for an in-line interceptor used to separate fats, oil and grease from wastewater, the interceptor having a wastewater inflow opening, an outflow opening and a grease collecting chamber hydraulically located between said inflow opening and said outflow opening, the inlet baffle assembly comprising:

an inlet baffle sized and shaped to fit within the grease collecting chamber of the interceptor, and adapted to operatively connect to said wastewater inflow opening of said interceptor, said inlet baffle defining a flow channel therethrough for directing wastewater entering from the wastewater inflow opening into the grease collecting chamber;

said inlet baffle comprising an elongate fixed baffle half for connecting to the inflow opening, and an elongate moveable baffle half associated with the elongate fixed baffle half to allow the elongate moveable baffle half to be moved from the elongate fixed baffle half between an open position and a closed position, the flow channel being formed between the elongate fixed and moveable baffle halves when the elongate moveable baffle half is in the closed position, and a flow control element positioned in said inlet baffle at an upstream end of said flow channel;

wherein said flow control element is adapted to control a rate or flow characteristic of said wastewater entering said flow channel when said second section of said inlet baffle is in said closed position; and wherein said flow control element is accessible for cleaning or inspection when said elongate moveable baffle half of said inlet baffle is in said open position.

22. The inlet baffle assembly of claim 21, further comprising an integrated air intake to facilitate entrainment of air into said wastewater flow.

23. The inlet baffle assembly of claim 21, further comprising a hinge operationally related to said elongate moveable baffle half and said elongate fixed baffle half.

24. The inlet baffle assembly of claim 21, wherein the inlet baffle further comprises an open bottom, optionally further comprising a hinge integrated attachment connected to said elongate moveable baffle half and said elongate fixed baffle half, the hinge being pivoted around a rotational axis and wherein the rotational axis of the hinged attachment is adjacent the open bottom.

25. The inlet baffle assembly of claim 21, further comprising an actuator connected between the elongate fixed baffle half and the elongate moveable baffle half of the inlet baffle,
wherein the actuator moves the elongate moveable baffle half between the open position and the closed position, and
optionally wherein the actuator is manually operable and is comprised of link arms and an actuator component which are operatively connected between the elongate fixed baffle half and the elongate moveable baffle half of the inlet baffle.

26. The inlet baffle assembly of claim 25, further comprising a removable handle extension to facilitate manual actuation of said handle in a below grade in-line interceptor.

27. The inlet baffle assembly of claim 21, wherein the flow control element further comprises a flow control plate including an orifice, or
wherein the flow control element further comprises a flow control plate fixed to the elongate moveable baffle half of the inlet baffle so that the flow control plate moves away from the elongate fixed baffle half of the inlet baffle when the elongate moveable baffle half is moved from the closed position to the open position to permit access to an inflow opening, the flow control element and internal surfaces of the inlet baffle assembly for cleaning.

28. The inlet baffle assembly of claim 21, wherein the elongate fixed baffle half and the elongate moveable baffle half are sized and shaped to produce a laminar flow of wastewater with reduced velocity into the grease collecting chamber.

29. The inlet baffle assembly of claim 21, wherein the inlet baffle and the flow control element are formed from a plastic material.

30. The inlet baffle assembly of claim 21, further comprising guide tabs for locating said inlet baffle assembly within said in-line interceptor, optionally wherein said guide tabs are sized and shaped to be received in vertical guide slots on said in-line interceptor.

31. The inlet baffle assembly of claim 21, wherein said flow control element includes both a flow restricting orifice and a flow deflector to direct flow within said inlet baffle.

32. A method of cleaning an inlet baffle assembly in an in-line interceptor, said in-line interceptor having a wastewater inflow opening, an outflow opening and a grease collecting chamber hydraulically located between said inflow opening and said outflow opening, said method comprising:
providing an inlet baffle assembly within the in-line interceptor, the inlet baffle assembly comprising:
an inlet baffle defining a flow channel therethrough for directing wastewater flowing from the wastewater inflow opening into the grease collecting chamber;
said inlet baffle comprising an elongate fixed baffle half adapted to connect to the wastewater inflow opening, and an elongate moveable baffle half associated with the elongate fixed baffle half to allow the elongate moveable baffle half to be moved from the elongate fixed baffle half between an open position and a closed position, the flow channel being formed between the elongate fixed and moveable baffle halves when the elongate moveable baffle half is in the closed position; and
a flow control element positioned in said inlet baffle at an upstream end of said flow channel, wherein said flow control element is adapted to control a rate or flow characteristic of the wastewater entering said flow channel when said elongate moveable baffle half is in said closed position;
operatively connecting said inlet baffle assembly to the wastewater inflow opening of the in-line interceptor;
moving said elongate moveable baffle half of said inlet baffle from said elongate fixed baffle half to said open position to provide access to said flow control element for cleaning;
cleaning said flow control element while said elongate moveable baffle half of said inlet baffle is in said open position; and
moving said elongate moveable baffle half of said inlet baffle to said closed position to facilitate said wastewater flowing through said flow control element and said flow channel into the grease collecting chamber, thereby preventing access to said flow control element.

33. The method of claim 32, wherein the elongate moveable baffle half is moveably connected to the elongate fixed baffle half,
wherein the inlet baffle assembly further comprises an actuator connected between the elongate fixed baffle half and the elongate moveable baffle half of the inlet baffle, and
wherein the method further comprising actuating the actuator to move the elongate moveable baffle half between the open position and the closed position, optionally in which the actuator is further comprised of link arms and a handle and the method further comprising manually operating the handle to move the elongate moveable baffle half between the open position and the closed position, or in which the flow control element further comprises a flow control plate and the method further comprising moving the flow control plate away from the elongate fixed baffle half of the inlet baffle assembly when the elongate moveable baffle half is moved into the open position.

34. The method of claim 32, wherein cleaning the inlet baffle assembly while the elongate moveable baffle half is in the open position further comprises allowing backed-up wastewater and debris to flow into the grease collection chamber when the second elongate moveable baffle half is in the open position.

* * * * *